Patented June 24, 1930

1,766,361

UNITED STATES PATENT OFFICE

HANS SCHMIDT, OF VOHWINKEL, NEAR ELBERFELD, GERMANY, ASSIGNOR TO WINTHROP CHEMICAL COMPANY, INC., OF NEW YORK, N. Y., A CORPORATION OF NEW YORK

FORMALDEHYDE BISULPHITE AMINO-ARYL-ANTIMONY COMPOUNDS

No Drawing. Application filed September 28, 1928, Serial No. 309,130, and in Germany October 6, 1927.

The present invention relates to new water soluble formaldehyde-bisulphite amino-aryl-antimony compounds and to a process of preparing the same.

In accordance with the invention stable, water soluble formaldehyde-bisulphite amino-aryl-antimony compounds are obtainable by reacting upon aminoaryl-antimony compounds in the presence of water with formaldehyde-bisulphite, or first with formaldehyde and then with a bisulphite. The probable course of the reaction is represented by the following equation, the sodium salt of amino-phenyl-stibinic acid being selected as starting compound:

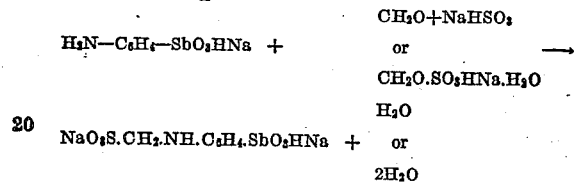

As amino-aryl-antimony compounds suitable for performing the reaction may be mentioned by way of example amino-aryl-stibinic acids, such as p-amino-phenyl-stibinic acid, m-chloro-p-amino-phenyl-stibinic acid, amino-aryl-stibinic oxides e. a. When starting from amino-aryl-stibinic acids it will be advantageous to use the same in form of their alkali metal salts, whereby here as well as in the case of other amino-aryl-antimony compounds the temperature may vary in wide limits, room temperature or slightly elevated temperatures being mentioned by way of example. The products thus obtainable probably are ω-methane-sulphonic acid derivatives of the amino-aryl-antimony compounds. They are in form of their alkali metal salts voluminous quite or nearly colorless powders, rather difficulty soluble in the usual organic solvents, easily soluble in water and are intended to be used for medicinal purposes in consequence of their solubility in water and medicinal activity.

The following example illustrates my invention without limiting it thereto:

Example: 50 grams of sodium para acetyl-amino-phenyl stibinate are treated with dilute caustic alkali, (allowing the neutral or alkaline solution, if desired, to stand in order to separate impurities) and precipitated with acetic acid. The para-amino-phenyl-stibinic acid thus obtained is isolated and the still wet paste is dissolved in 30 ccs. of water with the addition of the requisite amount of twice normal caustic soda, necessary to give a neutral solution. To this liquid are added 14 grams of formaldehyde-bisulphite, which readily dissolve on stirring. After standing for about 24 hours the liquid is again neutralized or rendered weakly alkaline with twice normal caustic soda and the reaction product is precipitated by pouring into alcohol. Its composition corresponds to the probable formula:

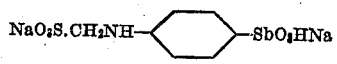

A voluminous powder is obtained, quite or nearly colorless and dissolving readily in water. The aqueous solution remains clear on the addition of dilute acetic acid.

Instead of the para-amino-phenylstibinic acid, partially deacylated acylaminoaryl-stibinic acids can also be subjected to the treatment with formaldehyde-bisulphite. Similarly other aminoarylstibinic acids or amino derivatives or aryl antimony compounds with antimony residues of other types, for example, aminoaryl stibinic oxides and the like can be used.

I claim:

1. Process which comprises reacting upon an amino-aryl-antimony compound with formaldehyde-bisulphite in the presence of water.

2. Process which comprises reacting upon an amino-aryl-stibinic acid with formaldehyde-bisulphite in the presence of water.

3. Process which comprises reacting upon p-amino-phenyl-stibinic acid with formaldehyde-bisulphite in the presence of water.

4. As new products formaldehyde-bisulphite derivatives of amino-aryl-antimony compounds, said products being in form of their alkali metal salts voluminous quite or nearly colorless powders rather difficultly soluble in the usual organic solvents, easily soluble in water.

5. As new products formaldehyde-bisulphite derivatives of amino-aryl-stibinic acids, said products being in form of their alkali metal salts voluminous quite or nearly colorless powders rather difficultly soluble in the usual organic solvents, easily soluble in water.

6. The formaldehyde-bisulphite of p-amino-phenyl-stibinic acid being in form of its sodium salt a nearly colorless powder easily soluble in water.

In testimony whereof I have hereunto set my hand.

PROF. DR. HANS SCHMIDT. [L. S.]